US012325240B2

(12) United States Patent
Sakaguchi et al.

(10) Patent No.: US 12,325,240 B2
(45) Date of Patent: Jun. 10, 2025

(54) LIQUID PACK AND METHOD OF PRODUCING THE SAME

(71) Applicant: BROTHER KOGYO KABUSHIKI KAISHA, Nagoya (JP)

(72) Inventors: Ai Sakaguchi, Kariya (JP); Eiichi Fujiwara, Nagoya (JP); Kenta Hasebe, Nagoya (JP); Kosuke Nukui, Nagoya (JP); Yutaka Takagiwa, Kariya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 140 days.

(21) Appl. No.: 17/820,116

(22) Filed: Aug. 16, 2022

(65) Prior Publication Data

US 2023/0057827 A1 Feb. 23, 2023

(30) Foreign Application Priority Data

Aug. 19, 2021 (JP) ................................ 2021-133840

(51) Int. Cl.
*B41J 2/175* (2006.01)

(52) U.S. Cl.
CPC ....... *B41J 2/17513* (2013.01); *B41J 2/17559* (2013.01); *B41J 2002/17516* (2013.01)

(58) Field of Classification Search
CPC .......................... B41J 2/17513; B41J 2/17559
See application file for complete search history.

(56) References Cited

U.S. PATENT DOCUMENTS 4,508,242 A * 4/1985 Wolfe .................. B65D 35/285 222/251
5,775,540 A * 7/1998 Greenberg ........... B65D 35/285 222/105
6,220,311 B1 * 4/2001 Litto .................... B67D 1/0462 141/98
2010/0295908 A1 * 11/2010 Katoh .................. B41J 2/17556 347/86
2015/0273841 A1 * 10/2015 Takagiwa ............... B41J 2/1752 347/86
2015/0273843 A1 10/2015 Takagiwa

FOREIGN PATENT DOCUMENTS

CN 108372725 A * 8/2018 ............. B41J 2/175
JP 2009-172918 A 8/2009
JP 2015-196299 A 11/2015

* cited by examiner

*Primary Examiner* — Sharon Polk
(74) *Attorney, Agent, or Firm* — Merchant & Gould P.C.

(57) ABSTRACT

There is provided a liquid pack including: a pouch configured to store a liquid therein; and a spout configured to be connectable to a part at one end in a first direction of the pouch, and having a channel in which the liquid passes. The pouch has: a liquid storing chamber configured to store the liquid therein and communicating with the channel of the spout, a sealing part configured to seal surrounding of the liquid storing chamber, and a liquid-non-storing chamber which is positioned to be separated with respect to the spout by the liquid storing chamber and the sealing part, and in which the liquid is not stored.

16 Claims, 13 Drawing Sheets

LIQUID PACK AND METHOD OF PRODUCING THE SAME

REFERENCE TO RELATED APPLICATIONS

This application claims priority from Japanese Patent Application No. 2021-133840 filed on Aug. 19, 2021. The entire content of the priority application is incorporated herein by reference.

BACKGROUND ART

In a certain publicly known ink pack, a bag body is divided into two by a partition-shaped seal part. An ink leading-out (delivering) member (spout) is welded to a port part of the bag body in a state that the ink leading-out member enters into the inside of the bag body. The ink-non-filling area and an ink filling area (an area, of the bag body, which is different from the ink-non-filling area) are arranged side by side, in an order closer to the ink leading-out member.

DESCRIPTION

Regarding the publicly known ink pack, however, in a case, for example, that the ink pack is applied to a winding mechanism configured to squeeze (press) an ink, there is such a task of reducing an amount of remaining ink (remaining ink) inside the ink leading-out member. Namely, there is such a problem that the ratio of a loss ink with respect to the volume of a pouch of the ink pack is high.

In view of the above-described situation, an object of the present disclosure is to provide a liquid pack capable of reducing the ink remaining amount in the spout as compared with a conventional or publicly known liquid pack, and to provide a method of producing the liquid pack.

According to an aspect of the present disclosure, there is provided a liquid pack including: a pouch configured to store a liquid therein; and a spout configured to be connectable to a part at one end in a first direction of the pouch, and having a channel in which the liquid passes. The pouch has: a liquid storing chamber configured to store the liquid therein and communicating with the channel of the spout, a sealing part configured to seal surrounding of the liquid storing chamber, and a liquid-non-storing chamber which is positioned to be separated with respect to the spout by the liquid storing chamber and the sealing part, and in which the liquid is not stored.

Since the liquid-non-storing chamber is provided, it is possible to reduce the volume of the pouch without changing the outer shape of the pouch from that of an existing pouch. Further, the liquid-non-storing chamber is positioned to be separated with respect to the spout, by the liquid storing chamber and the sealing part. With this, it is possible to reduce the ink remaining amount (remaining ink) in the spout at a time of squeezing (pushing) out the ink by the winding mechanism, etc., as compared with a conventional technique, to an extent corresponding to not being through the non-ink-storing chamber, as in the conventional technique, in a case of connecting the spout to the liquid storing chamber. With this, it is possible to reduce the loss ink, and is, consequentially, economic.

In the following, a liquid pack and a method of producing the liquid pack according to an embodiment of the present disclosure will be explained, with reference to the drawings. Each of the liquid pack and the method of producing the liquid pack to be explained below is merely an example of the present disclosure. Accordingly, the present disclosure is not limited to or restricted by the following embodiment, and any addition, deletion and/or change is/are possible within a range not departing from the spirit of the present disclosure.

First Embodiment

First, a liquid pack configured to be accommodated in a cartridge case will be explained, and then the cartridge case will be explained. The cartridge case of the present disclosure is installable, for example, in a printer disclosed in U.S. Pat. No. 9,290,000. The disclosure of U.S. Pat. No. 9,290,000 is incorporated herein by reference in its entirety.

Figure 1:
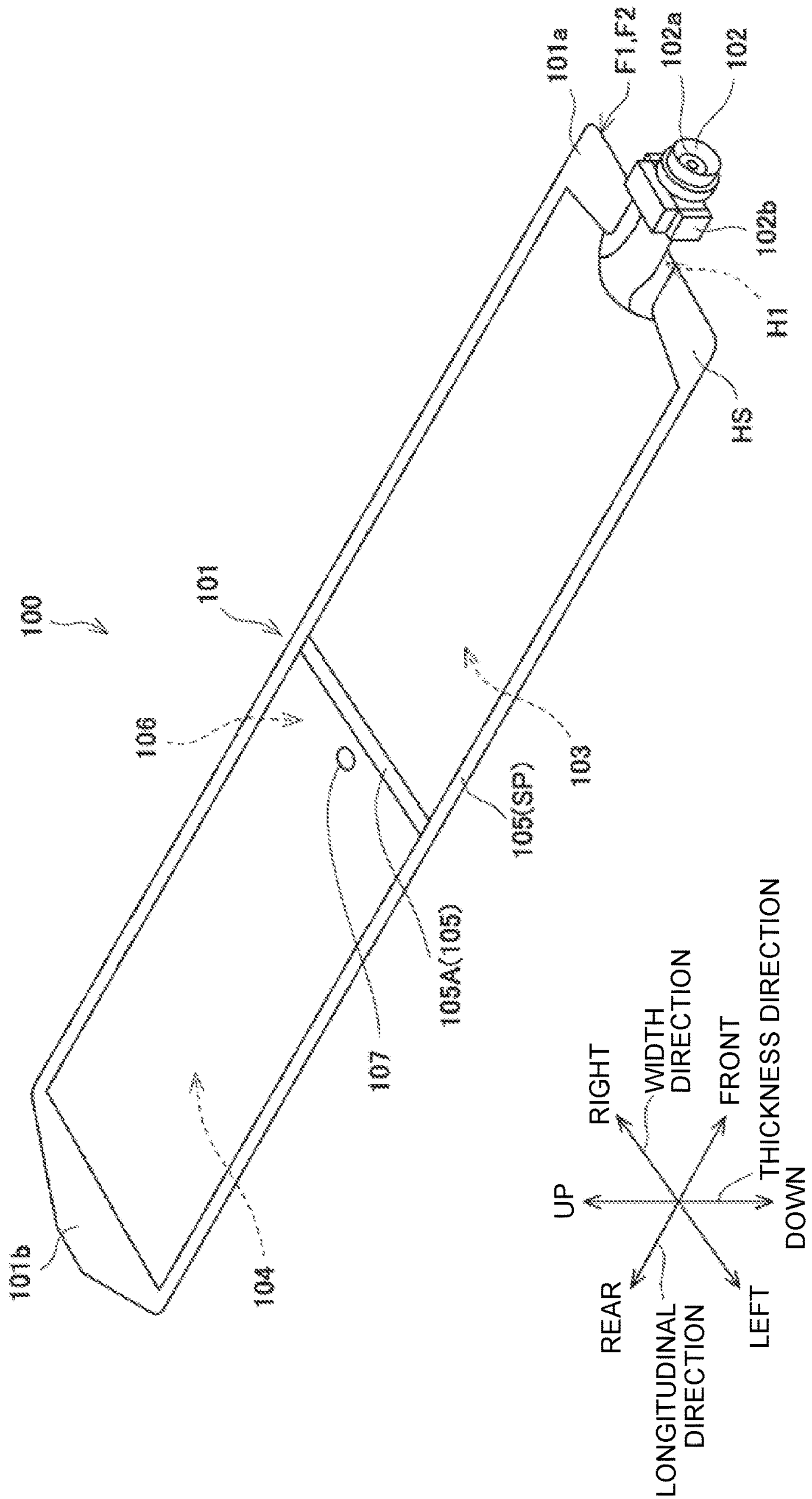
FIG. 1 is a perspective view depicting a liquid pack.

FIG. 1 is a perspective view depicting a liquid pack 100 according to an embodiment of the present disclosure. In FIG. 1, directions which are orthogonal to one another are defined as a longitudinal direction, a width direction and a thickness direction. The longitudinal direction corresponds to a predetermined direction or a first direction, and is an extending direction in which a pouch 101 of the liquid pack 100 extends. In the longitudinal direction, a side of a spout 102 (to be described later on) is defined as the front side, and a side opposite thereto is defined as the rear side. Further, in the width direction, the right side with respect to the spout 102 is defined as the right side (rightward), and a side opposite thereto is defined as the left side (leftward).

As depicted in FIG. 1, the liquid pack 100 is provided with the pouch 101 configured to store, for example, a liquid such as an ink and formed to have an elongated shape, and a spout 102 connectable to one end 101*a* in the longitudinal direction of the pouch 101. Note that the other end 101*b* in the longitudinal direction of the pouch 101 is formed to be tapered toward the rear side, specifically, is formed, for example, to have a trapezoidal shape in a plane view.

The pouch 101 is formed, for example, by partially welding two elastic films F1 and F2 so as to have a bag shape. Such a pouch 101 has a liquid storing chamber 103, a liquid-non-storing chamber 104 and a sealing part 105. A liquid, for example, such as an ink, etc., is stored in the liquid storing chamber 103. The liquid storing chamber 103 is communicated with one end of a channel 102*a* of the spout 102. The other end of the channel 102*a* of the spout 102 is communicated to the outside, and the liquid is filled in the liquid storing chamber 103 via the channel 102. Further, the liquid-non-storing chamber 104 is a closed space, and is a chamber in which the liquid is not stored. In the present embodiment, the liquid-non-storing chamber 104 is positioned to be separated or isolated with respect to the spout 102 by the liquid storing chamber 103 and the sealing part 105.

An example of the ink storable in the liquid storing chamber 103 of the pouch 101 is exemplified by a normal ink (ink for which any light shielding is not required) and a photocurable ink (ink for which the light shielding is required). In a case that the photocurable ink is stored in the liquid storing chamber 103, at least a part, of the pouch 101, corresponding to the liquid storing chamber 103 is formed of a light shielding film.

The sealing part 105 is formed by heat welding of the two films F1 and F2, and seals surroundings of the liquid storing chamber 103 and the liquid-non-storing chamber 104. The liquid storing chamber 103 and the liquid-non-storing chamber 104 are partitioned from each other by a partition part 105A forming a part of the sealing part 105. Namely, the partitioning part 105A of the sealing part 105 is positioned between the one end 101*a* and the other end 101*b* of the pouch 101 in the longitudinal direction of the pouch 101.

A method of forming the liquid storing chamber 103 and the liquid-non-storing chamber 104 will be explained. First, periphery parts SP the two films F1 and F2 having the elongated shape are heat welded so as to form the sealing part 105 and to form the pouch 101 having the bag shape and having an opening H1, which communicates with the outside, in the one end 101*a* in the longitudinal direction of the pouch 101. In this state, the spout 102 is attached to the opening H1 of the pouch 101 by the heat welding. With this, a compartment 106 is formed in the inside of the pouch 101 by the sealing part 105 and the spout 102. Further, the two films F1 and F2 are partially welded so as to partition the compartment 106 into the liquid storing chamber 103 on the near side of the one end 101*a* in the longitudinal direction of the pouch 101 and the liquid-non-storing chamber 104 on the near side of the other end 101*b* in the longitudinal direction of the pouch 101, thereby forming the partition part 105A. With this, the liquid storing chamber 103 is arranged on the near side of the one end 101*a* of the pouch 101 with respect to the partition part 105A, and the liquid-non-storing chamber 104 is arranged on the near side of the other end 101*b* of the pouch 101 with respect to the partition part 105A.

FIG. 1 depicts the example in which the partitioning part 105A is arranged in the center in the longitudinal direction of the pouch 101. The present disclosure, however, is not limited to this; it is allowable that the partitioning part 105A is positioned, in the longitudinal direction, between the one end 101*a* and the other end 101*b* of the pouch 101, as described above. For example, it is allowable to arrange the partitioning part 105A at a location which is between the one end 101*a* and the other end 101*b* of the pouch 101 and which is closer to the one end 101*a*; alternatively, it is allowable to arrange the partitioning part 105A at a location which is between the one end 101*a* and the other end 101*b* of the pouch 101 and which is closer to the other end 101*b*. Further, the partitioning part 101A extends parallel to the width direction. The partitioning part 105A is formed linearly.

An air hole 107 which links the liquid-non-storing chamber 104 and the outside thereof is provided on the pouch 101. The opening of the air hole 107 is formed, for example, to have a circular shape, and the air hole 107 penetrates the pouch 101 in the thickness direction. Note that the opening of the air hole 107 is not limited to being the opening having the circular shape, and may be formed to have a shape different from the circular shape, for example, an elliptical shape, etc. The air hole 107 is arranged, for example, in the center in the width direction of the liquid-non-storing chamber 104.

The spout 102 is formed, for example, to have a tubular shape by using a resin material, and has the channel 102*a* communicating the liquid storing chamber 103 and the outside thereof. The spout 102 has a positioning part 102*b* with respect to the cartridge case 200, the positioning part 102*b* protruding from a front outer edge of the pouch 101 (to be described as follows).

Figure 2:
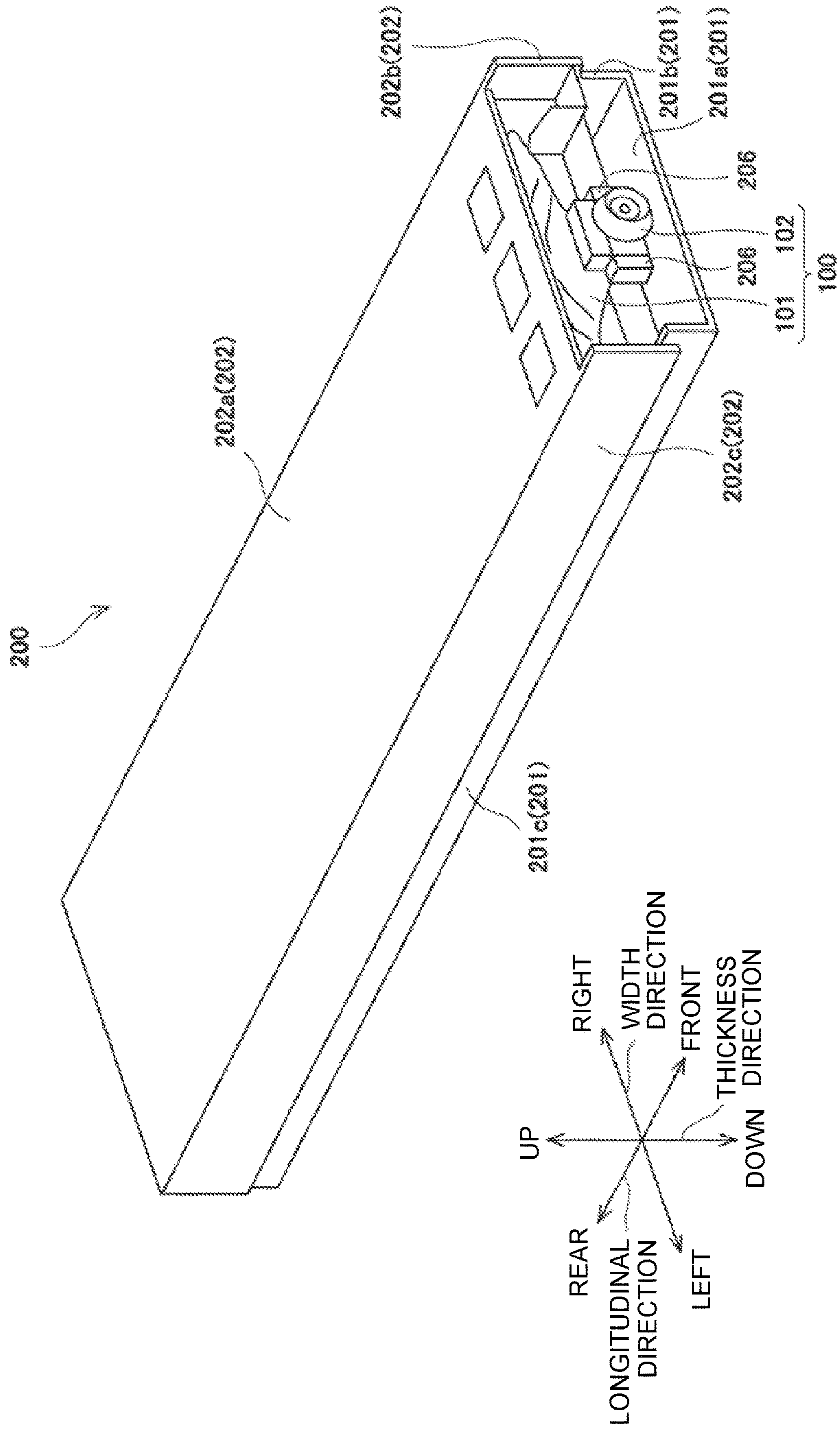
FIG. 2 is a perspective view depicting a cartridge case in which the liquid pack of FIG. 1 is installed.
Figure 3:
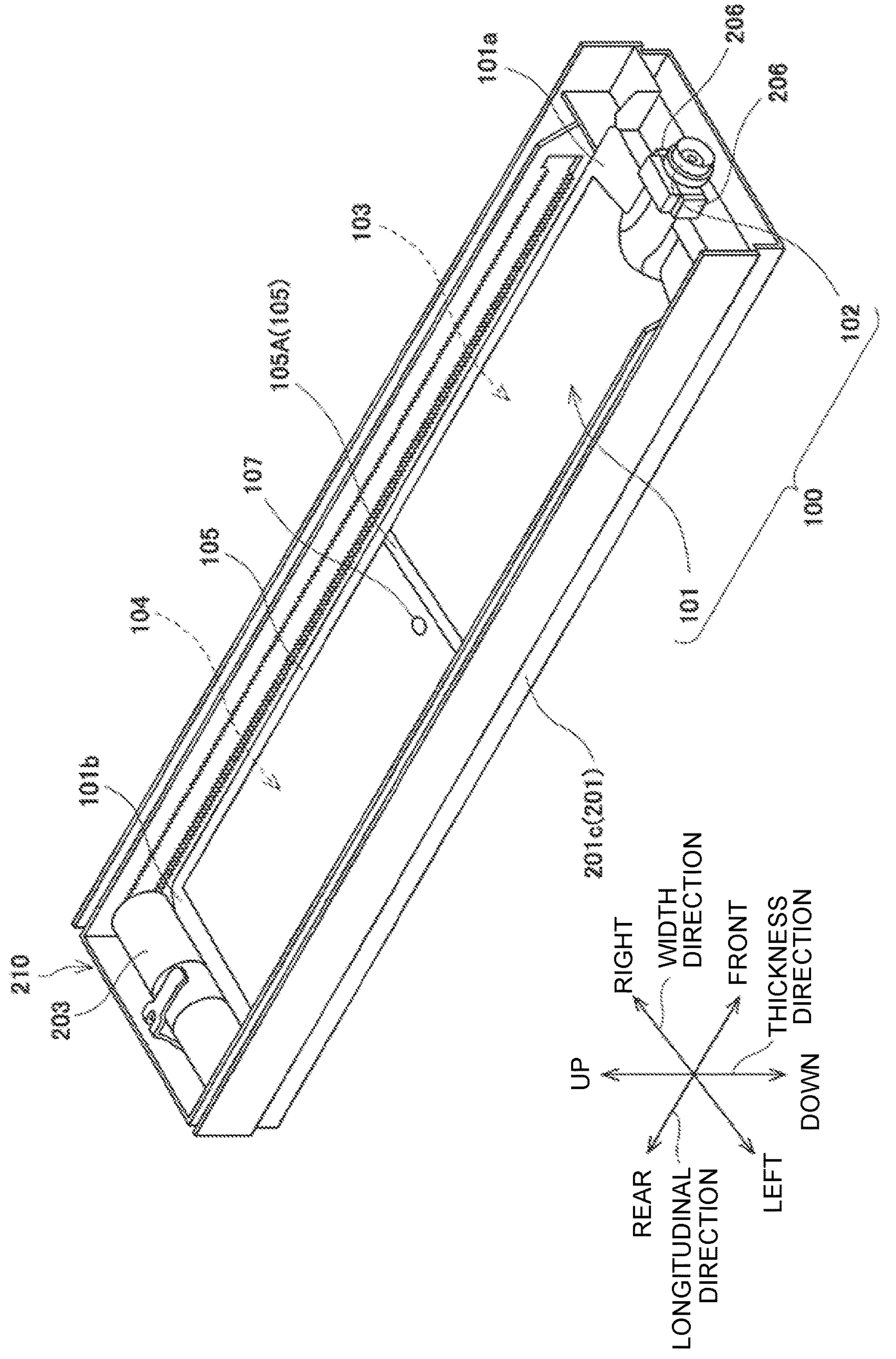
FIG. 3 is a perspective view depicting a state that a lid part of the cartridge case of FIG. 2 is removed.

Next, FIG. 2 is a perspective view depicting a cartridge case 200 in which the liquid pack 100 of FIG. 1 is installed. Further, FIG. 3 is a perspective view depicting a state that a lid part 202 of the cartridge case 200 of FIG. 2 is removed.

As depicted in FIG. 2, the cartridge case 200 of the present embodiment is provided with a case main body 201 having an elongated shape extending in a direction same as the longitudinal direction of the pouch 101, and a lid part 202 which has an elongated shape and which is positioned at a location above the case main body 201 so as to cover the case main body 201. Further, as depicted in FIG. 3, the cartridge case 200 has a winding mechanism 210 having a winding roller 203 extending in the width direction, and a pair of spout supporting parts 206. The size in the width direction of the winding roller 203 is substantially same as the size in the width direction of the pouch 101. In addition to the winding roller 203, the winding mechanism 210 has a roller shaft 203*a* (FIGS. 4A and 4B) connected to the winding roller 203, and a leaf spring 207 (FIGS. 4A and 4B) which will be described in detail later on. Note that a left end of the roller shaft 203*a* protrudes outward from the left end of the winding roller 203, and a right end of the roller shaft 203*a* protrudes outward from the right end of the winding roller 203. Further, the winding mechanism 210 as described above is an example of a “pushing out mechanism” configured to apply a force to the liquid storing chamber 103 so as to push out the liquid; other than the winding mechanism 210, as another example, it is allowable to adopt a configuration wherein the pouch 101 is held one roller and the other roller of a roller pair and the liquid inside the pouch 101 is pushed out by the roller pair.

In FIG. 2, the pair of spout supporting parts 206 in which the spout 102 is installable is provided on a front end of the case main body 201. The liquid pack 100 is supported by the case main body 201 in a state that the spout 101 is installed in the pair of spout supporting parts 206.

The lid part 202 is formed to have a recessed shape of which lower part is opened. The lid part 202 has a top plate part 202*a* having an elongated shape, and outer wall parts 202*b* and 202*c* which protrude or project downward from, respectively, a right end and a left end in the width direction of the top plate part 202*a*. Note that the lid part 202 has inner wall parts (not depicted in the drawings) which protrude downward in, respectively, inner sides of the outer wall parts 202*b* and 202*c* which are on the both sides in the width direction.

On the other hand, the case main body 201 is formed to have a recessed shape of which upper part is opened. The case main body 201 has a bottom plate part 201*a* having an elongated shape, and wall parts 201*b* and 201*c* which protrude upward from, respectively, a right end and a left end in the width direction of the bottom plate part 201*a*. In such a configuration, in a case that the lid part 202 is positioned above the case main body 201, the wall part 201*b* of the case main body 201 is arranged between the outer wall part 202*b* and the one of the inner wall parts of the lid part 202, and the wall part 201*c* of the case main body 201 is arranged between the outer wall part 202*c* and the other of the inner wall parts of the lid part 202. In this state, the lid part 202 is slidably movable in the front-rear direction with respect to the mase main body 201. With this, in the case that the liquid pack 100 is installed in the cartridge case 200, it is possible to slide the lid part 202 rearward to thereby release the upper part of the case main body 201.

Here, in the case of installing the liquid pack 100 in the cartridge case 200, the winding roller 203 is moved to a location on the rear side of the liquid pack 100, as depicted in FIG. 3. In the following, a procedure of installing the liquid pack 100 in the cartridge case 200 will be explained, with reference to the drawings.

Figure 4A:
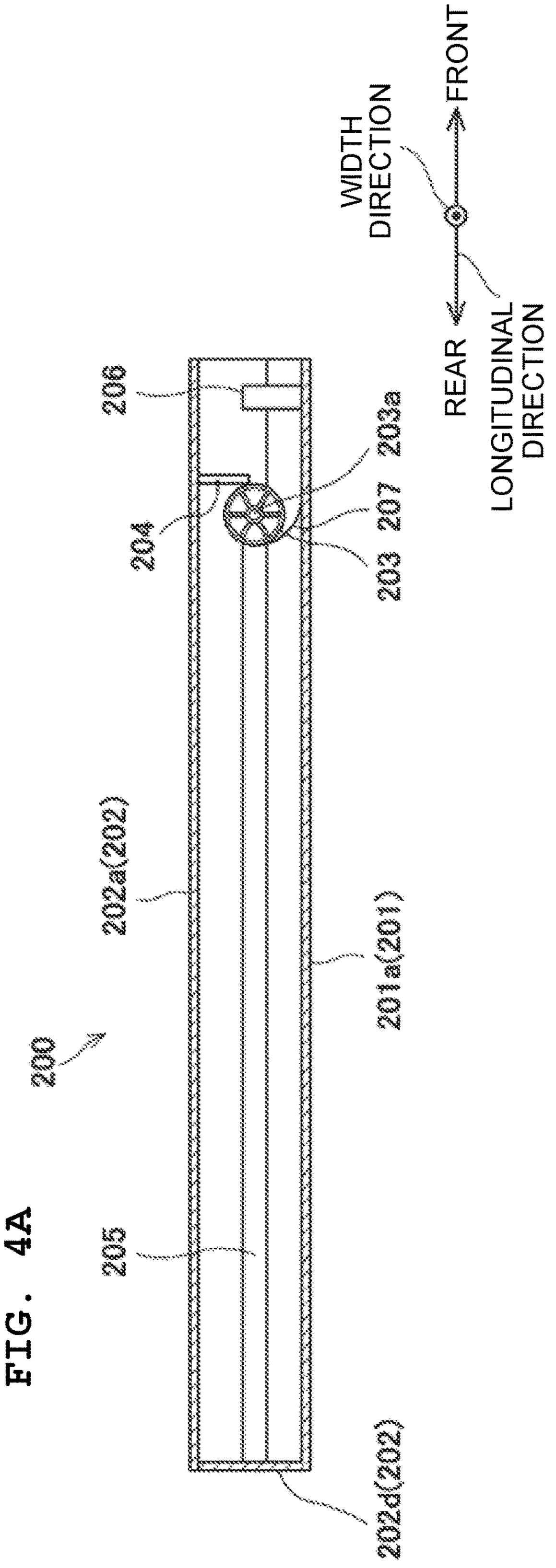
FIGS. 4A and 4B are each a cross-sectional view depicting a procedure of installing the liquid pack in the cartridge case.
Figure 4B:
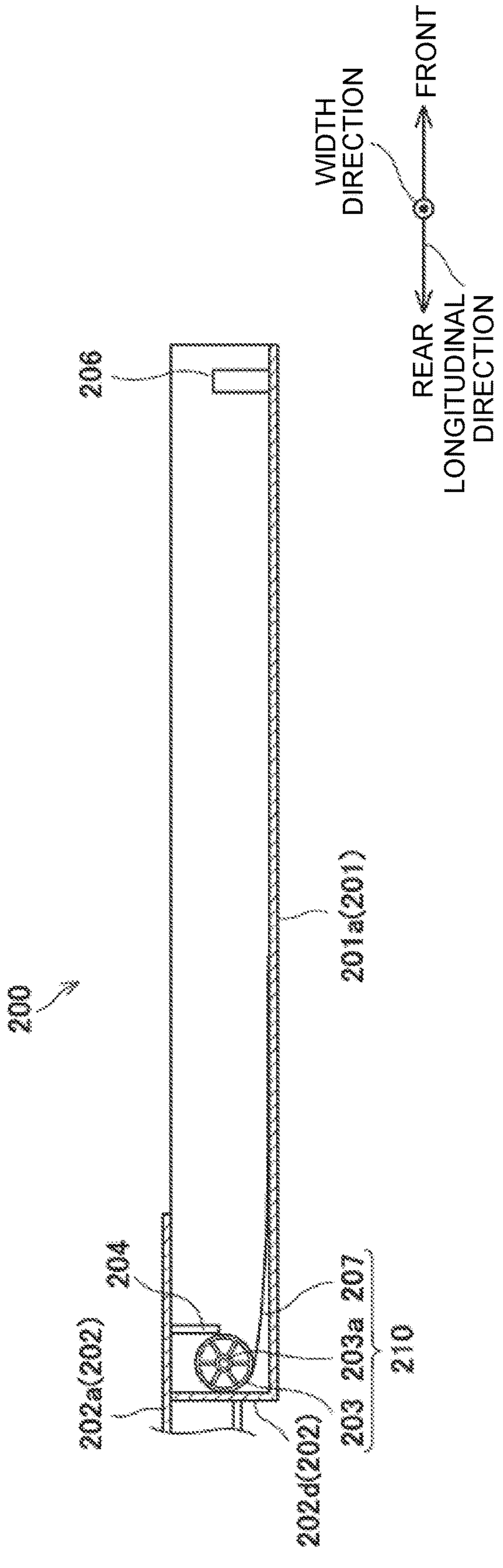

FIGS. 4A and 4B and FIGS. 5A and 5B are each a cross-sectional view depicting the procedure of installing the liquid pack 100 in the cartridge case 200. As depicted in FIG. 4A, a front end of the leaf spring 207 of the winding mechanism 210 is fixed to a predetermined position at a front part of the bottom plate part 201*a* of the case main body 201. Further, as depicted in FIG. 4A, a rear end of the leaf spring 207 is fixed to the winding roller 203. The leaf spring 207 is configured to generate an urging force frontward in the longitudinal direction. With this, in a case that the winding roller 203 is moved rearward as depicted in FIG. 4B, the leaf spring 207 is in a state of being extended in the front-rear direction.

In FIG. 4A, pressing parts 204 are provided on a front part of the inner surface of the top plate part 202*a* of the lid part 202, respectively, at the both sides in the width direction. Each of the pressing parts 204 is provided to protrude up to a height position which is lower than a highest part of the winding roller 203. In such a configuration, since the leaf spring 207 generates the force urging the winding roller 203 frontward in the longitudinal direction as described above, the winding roller 203 makes contact with the respective pressing parts 204 in a case that the liquid pack 100 is not installed.

In a side view of the cartridge case 200, the roller shaft 203*a* is connected to the center of the winding roller 203. A right end of the roller shaft 203*a* moves in the front-rear direction along one of moving routes 205 formed by one of the above-described inner wall parts of the lid part 202 and the wall part 201*b* of the case main body 201. Similarly, a left end of the roller shaft 203*a* moves in the front-rear direction along the other of the moving routes 205 formed by the other of the above-described inner wall parts of the lid part 202 and the wall part 201*c* of the case main body 201. With this, the winding roller 203 is made to be movable in the front-rear direction. Note that the moving route(s) 205 is depicted only in FIG. 4A, and is omitted in the illustration of FIG. 4B and FIGS. 5A and 5B.

Following the step depicted in FIG. 4A, as depicted in FIG. 4B, the lid part 202 is slid rearward with respect to the case main body 201. With this, it is possible to move the winding roller 203 to move rearward along the moving routes 205 by the respective pressing parts 204. In this case, the winding roller 203 is moved until the winding roller 203 makes contact with an inner surface of a rear wall part 202*d* of the case main body 202. In this situation, in FIG. 4B, the leaf spring 207 is arranged in the state of being extending in the front-rear direction.

Figure 5A:
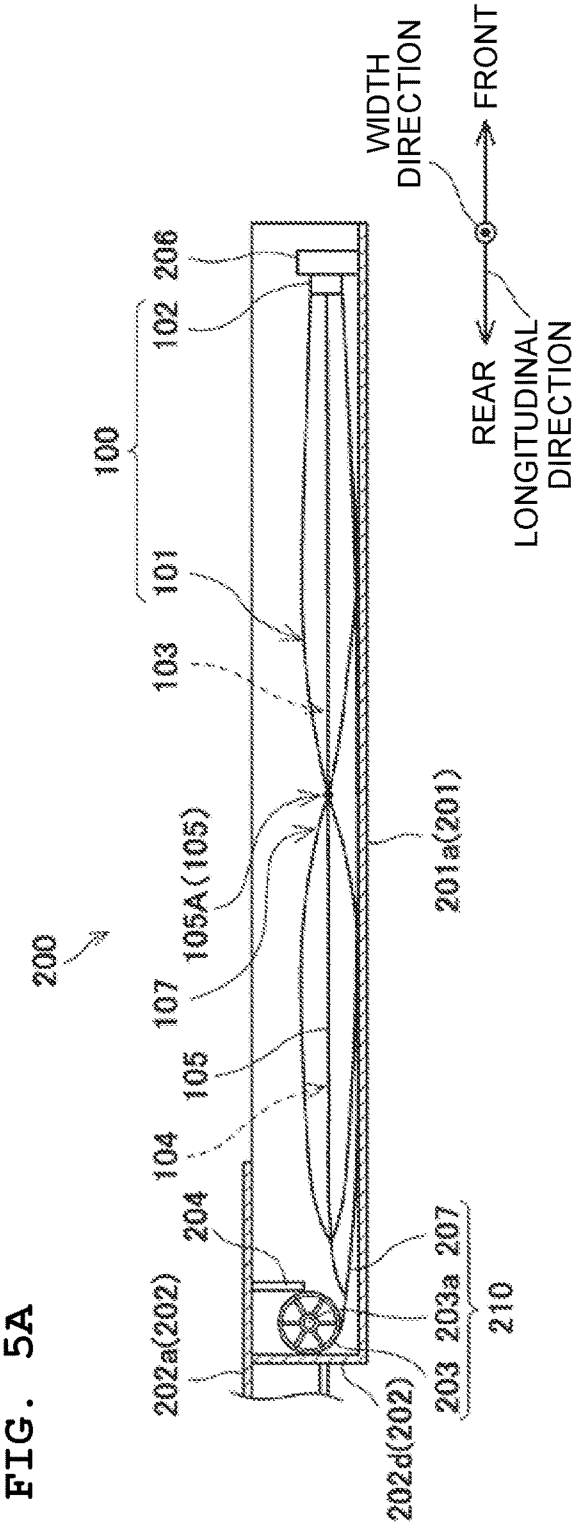
FIGS. 5A and 5B are each a cross-sectional view following FIG. 4B and depicting the procedure of installing the liquid pack in the cartridge case.

Following the step depicted in FIG. 4B, as depicted in FIG. 5A, the liquid pack 100 is arranged in the case main body part 201 from thereabove, and the spout 102 is installed in the pair of spout supporting parts 206 as well. In this case, a right end of the positioning part 102*b* of the spout 102 is engaged with the spout supporting part 206 on the right side, and a left end of the positioning part 102*b* is engaged with the spout supporting part 206 on the left side. With this, the liquid pack 100 is fixed to the case main body 201. Note that the method of installing the spout 102 is not limited to the above-described method, and it is allowable to adopt a variety of kinds of installing methods.

Figure 5B:
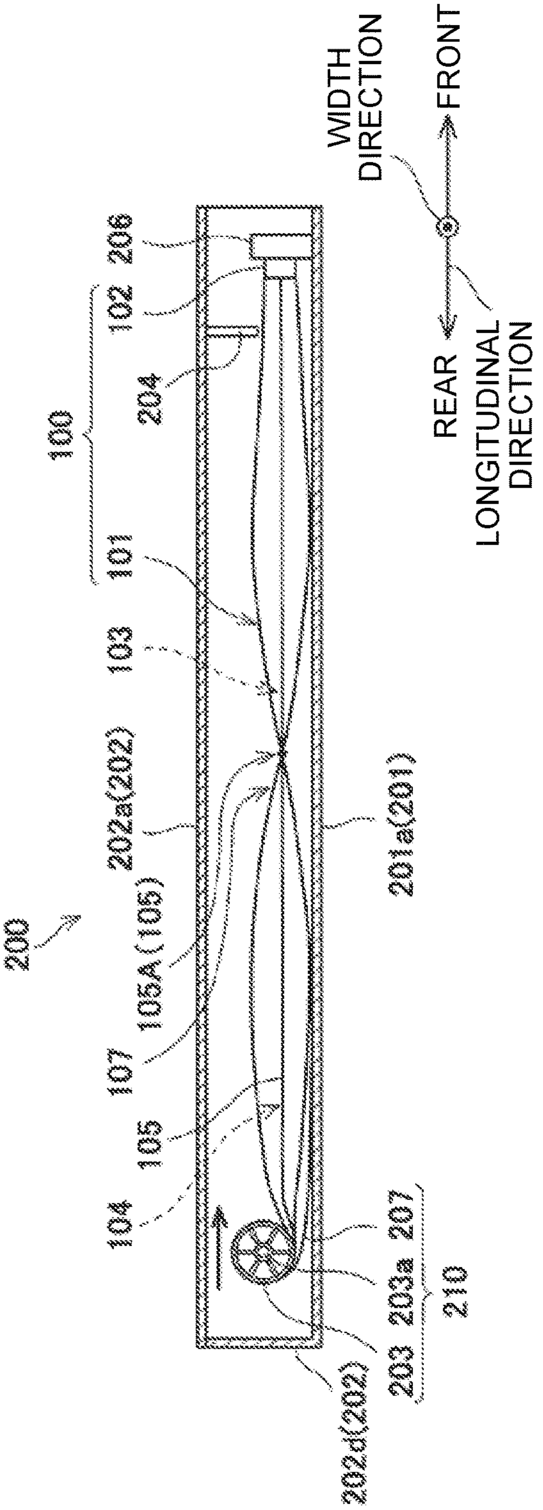

Following the step depicted in FIG. 5A, as depicted in FIG. 5B, the lid part 202 is moved frontward with respect to the case main body 201, to thereby make the case main body 201 to be in a closed state. In this situation, accompanying with the frontward movement of the lid part 202, the respective pressing parts 204 move frontward. With this, the pressing with respect to the winding roller 203 by the respective pressing parts 204 are released, which in turn allows the winding roller 203 to start moving frontward by the urging force of the leaf spring 207, while rotating about the roller shaft 203*a*.

Then, in a case that the winding roller 203 winds up a part, of the pouch 101, in which the liquid-non-storing part 104 is formed, the air inside the liquid-non-storing part 104 is exhausted or released to the outside, via the air hole 107. With this, it is possible to wind, by the winding roller 203, up a part in the pouch 101 in which the liquid-non-storing part 104 is formed. Afterwards, the winding roller 203 makes contact with a part, of the pouch 101, in which the liquid storing part 103 is formed, and is stopped. Namely, in the case that the liquid pack 100 is installed in the cartridge case 200, the pouch 101 makes contact with the winding mechanism 210 as the pushing out mechanism. Afterwards, accompanying with decrease in the thickness of the pouch 101 due to delivery of the liquid from the liquid storing chamber 103, the winding roller 203 moves frontward by the urging force of the leaf spring 207, while winding up the part, of the pouch 101, in which the liquid storing chamber 103 is formed. By the above-described method, the winding up of the pouch 101 is performed. Note that although the present embodiment uses the leaf spring 207, it is allowable to adopt a configuration by which a motive force for winding up the pouch 101 is generated by a motor, instead of the leaf spring 207.

Figure 6:
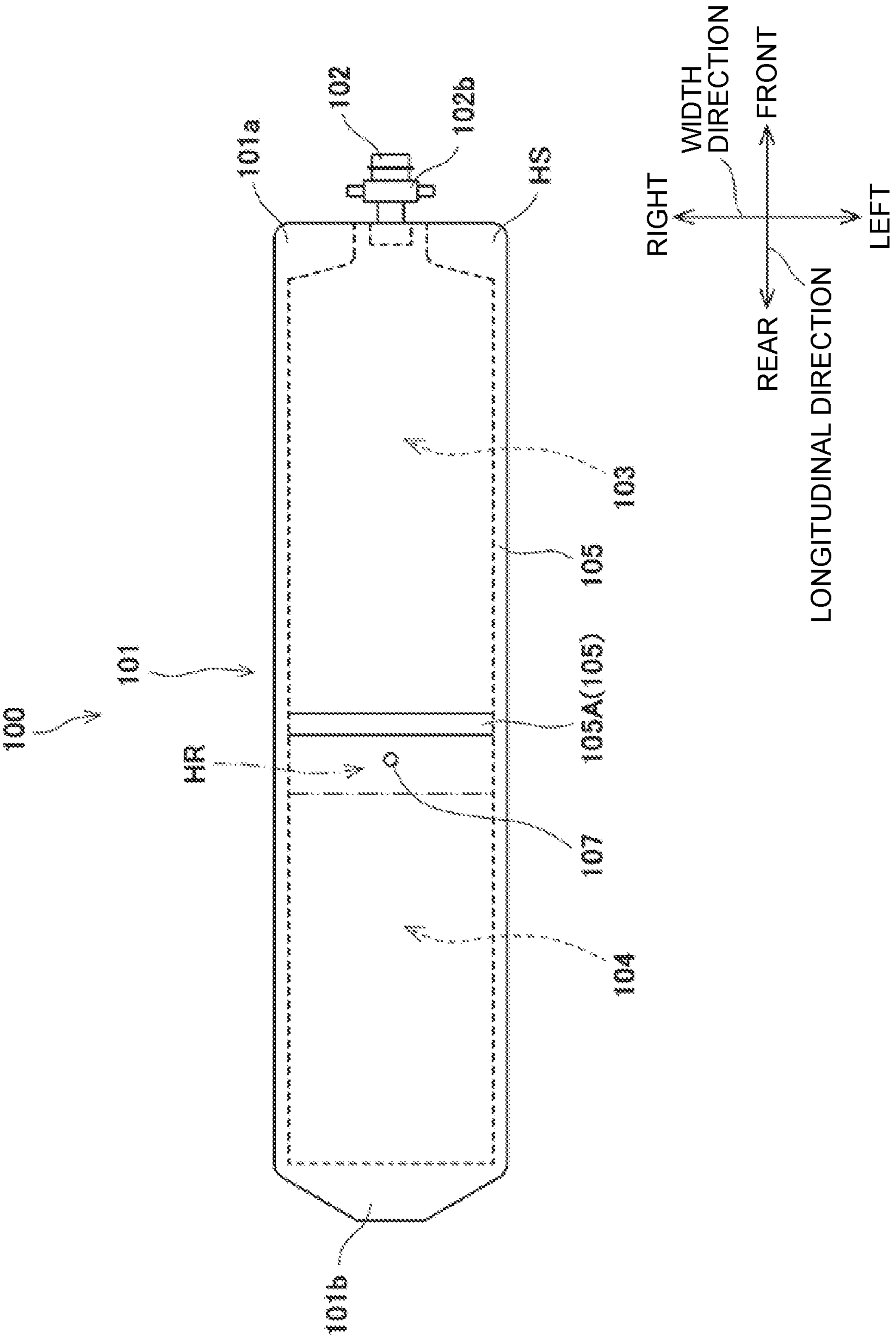
FIG. 6 is a plane view depicting the liquid pack of FIG. 1.

FIG. 6 is a plane view depicting the liquid pack 100 of FIG. 1. In the present embodiment, the air hole 107 may be arranged as follows. As depicted in FIG. 6, the air hole 107 is arranged at an area HR extending from the partitioning part 105A toward the other end 101*b* of the pouch 101, a length in the longitudinal direction of the pouch 101 of the area HR corresponding to a diameter of the winding roller 203. Note that in FIG. 6, it is allowable to arrange two or more pieces of the air hole 107, with an equal spacing distance therebetween, along the width direction of the pouch 101, namely, along the extending direction of the winding roller 203.

As described above, according to the present embodiment, since the liquid-non-storing chamber 104 is provided on the pouch 101, it is possible to reduce the volume of the pouch 101, without changing the outer shape of the pouch 101 from that of an existing pouch. Further, the liquid-non-storing chamber 104 is positioned to be separated with respect to the spout 102, by the liquid storing chamber 103 and the sealing part 105. With this, it is possible to reduce the remaining liquid in the spout 102 at a time of squeezing or pushing out the liquid by the winding mechanism 210, as compared with a conventional technique, to an extent corresponding to not being through the non-ink-storing chamber 104, as in the conventional technique, in the case of connecting the spout 102 to the liquid storing chamber 103. With this, it is possible to reduce the loss liquid (loss ink), and is, consequentially, economic.

Further, in the present embodiment, the liquid storing chamber 103 is arranged on the near side of the one end 101*a* of the pouch 101, with respect to the partition part 105A, and the liquid-non-storing chamber 104 is arranged on the near side of the other end 101*b* of the pouch 101, with respect to the partition part 105A. Owing to such a configuration, it is possible to easily separate the liquid-non-storing chamber 104 with respect to the spout 102.

Further, in the present embodiment, the air hole 107 linking the liquid-non-storing chamber 104 and the outside is provided on the pouch 101. With this, in a case that the part, of the pouch 101, corresponding to the liquid-non-storing chamber 104 is wound up by the winding roller 203, the air inside the liquid-non-storing chamber 104 can be exhausted or released to the outside. With this, it is possible to reduce the load on the winding roller 203 in the case of winding up the part, of the pouch 101, corresponding to the liquid-non-storing chamber 104 by the winding roller 203, thereby making it easier to wind up this part of the pouch 101.

Further, in the present embodiment, in a case that the liquid pack 100 is installed in the cartridge case 200, the pouch 100 is configured to make contact with the winding roller 203 of the winding mechanism 210. With this, it is possible to easily wind the pouch 101 up by the winding roller 203, thereby making it possible to easily push out the liquid inside the pouch 101.

Furthermore, in the present embodiment, the air hole 107 is arranged at the area HR extending from the partitioning part 105A toward the other end 101*b* of the pouch 101, the length in the longitudinal direction of the pouch 101 of the area HR corresponding to the diameter of the winding roller 203. In such a manner, by arranging the air hole 107 as close as possible to the vicinity of the partitioning part 105A, it is possible to prevent the air hole 107 being closed or blocked by a part, of the pouch 101, which has been already wound up in the case of winding the pouch 101 up by the winding roller 203. With this, it is possible to satisfactorily release the air inside the liquid-non-storing chamber 104 from the air hole 107 in the case of performing the winding-up with the winding roller 203.

Moreover, in the present embodiment, by allowing the spout 102 to have the positioning part 102*b*, it is possible to easily position the liquid pack 100 with respect to the cartridge case 200.

Further, in the present embodiment, the partitioning part 105A extends parallel to the width direction of the pouch 101. With this, a pressure, which is generated in the vicinity of the partitioning part 105A (the vicinity, of the partitioning part 105A, on the near side of the liquid storing chamber 103) in such a case that the pouch 101 is dropped is easily dispersed in the extending direction of the partitioning part 105A, thereby making the pouch 101 to be unlikely to be torn or ripped.

Second Embodiment

Figure 7:
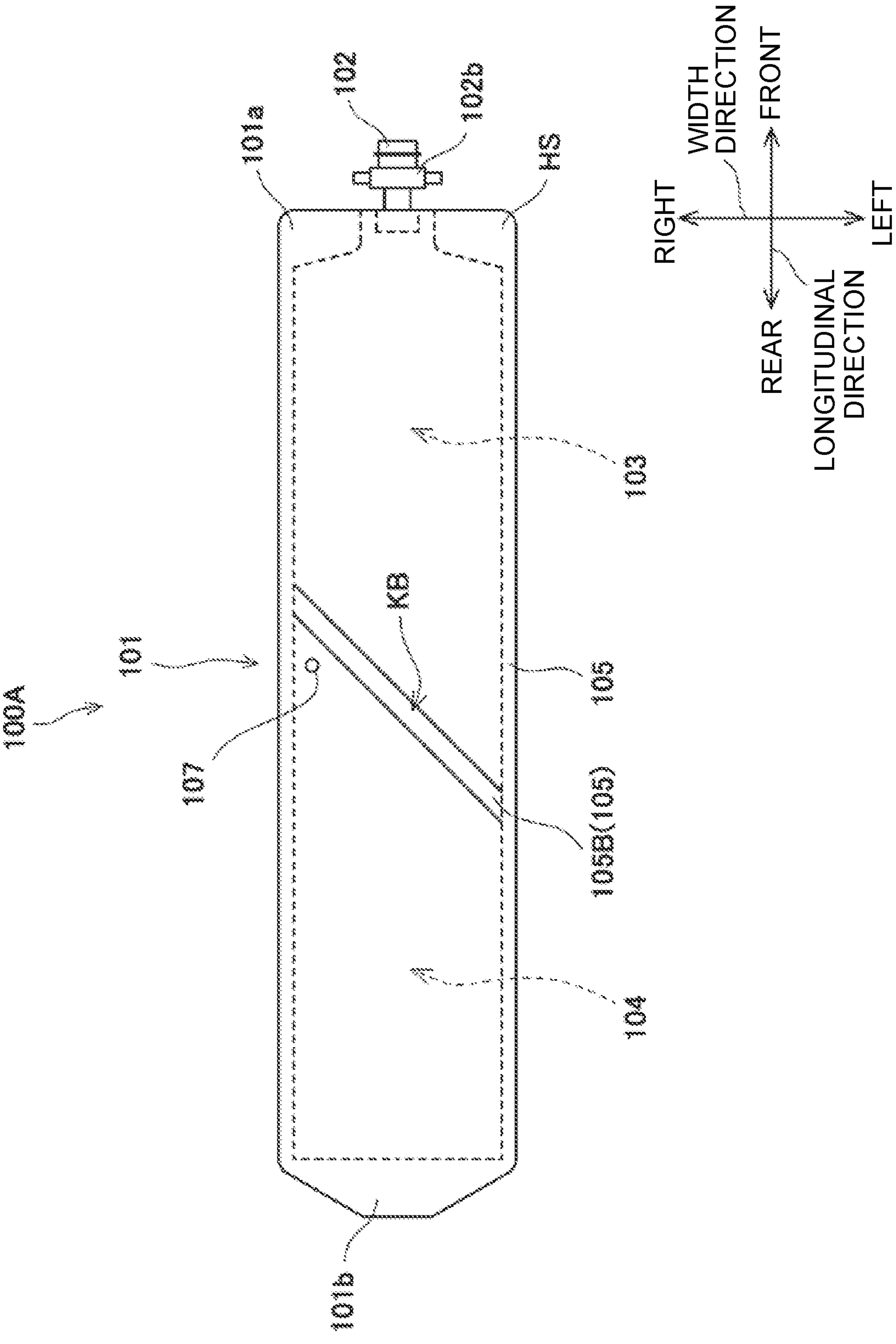
FIG. 7 is a plane view depicting an example of the liquid pack.

Next, a liquid pack 100A of a second embodiment will be explained. FIG. 7 is a plane view depicting the liquid pack 100A according to the second embodiment. Note that the liquid pack 100A of the second embodiment and liquid packs of a third embodiment and thereafter, which will be described later on, are similar to the liquid pack 100 of the first embodiment, except for the shape of the partitioning part and the arrangement of the air hole. Accordingly, in each of the respective embodiments as follows, only a point or configuration different from the liquid pack 100 of the first embodiment will be explained, except for a part thereof.

As depicted in FIG. 7, similarly to the first embodiment, a partitioning part 105B is arranged so that a liquid storing chamber 103 is arranged on the near side of one end 101*a* of the pouch 100 and that a liquid-non-storing chamber 104 is arranged on the near side of the other end 101*b* of the pouch 101.

Although the partitioning part 105B is formed to have a linear shape similarly to the partitioning part 105A of the first embodiment, the partitioning part 105B of the second embodiment is formed to cross the width direction. Namely, the partitioning part 105B has a part KB which crosses with respect to the roller shaft 203*a* in a case that the liquid pack 100A is installed in the cartridge case 200. In the second embodiment, the partitioning part 105B as a whole corresponds to the above-described part KB.

The partitioning part 105B is arranged obliquely as seen in a plane view so that a left end of the partitioning part 105B is positioned on the rear side with respect to a right end of the partitioning part 105B. Note, however, that the shape of the partitioning part 105B is not limited to this; it is allowable that the partitioning part 105B is arranged obliquely as seen in a plane view so that the right end of the partitioning part 105B is positioned on the rear side with respect to the left end of the partitioning part 105B.

The air hole 107 is arranged at a position in which the air hole 107 is closer to the right end, which is a front end, of the partitioning part 105B, than to the left end, which is a rear end of the partitioning part 105B. Note that, as described above, in the case that the partitioning part 105B is arranged obliquely so that the right end of the partitioning part 105B is positioned on the rear side with respect to the left end of the partitioning part 105B, the air hole 107 is arranged at a position at which the air hole 107 is closer to the left end of the partitioning part 105B than to the right end of the partitioning part 105B.

Also by the liquid pack 100A of the second embodiment, it is possible to reduce the volume of the pouch 101, without changing the outer shape of the pouch 101 from that of the existing pouch, and to reduce the loss liquid (loss ink), similarly to the liquid pack 100 of the first embodiment.

Further, in the second embodiment, the partitioning part 105B is arranged obliquely in the plane view. Namely, the partitioning part 105B is arranged to be cross the extending direction of the winding roller 203. Accordingly, it is possible to make a contact area in the width direction, of the partitioning part 105B, with respect to the winding roller 203, to be small. With this, it is possible to make the load on the winding roller 203 applied by the partitioning part 105B to be relatively small, thereby making it possible to easily wind the pouch 101 up by the winding roller 203. Furthermore, in the case of performing the winding-up by the winding roller 203, the air inside the liquid-non-storing chamber 104 easily and locally concentrates to the vicinity of the air hole 107, thereby making it possible to easily exhaust or release the air from the air hole 107 to the outside. With this, it is possible to improve the exhausting property or releasability of the air inside the liquid-non-storing chamber 104. Moreover, since the number of the air hole 107 can be made to be one, it is possible to reduce the number of the steps in a hole opening step.

Third Embodiment

Figure 8:
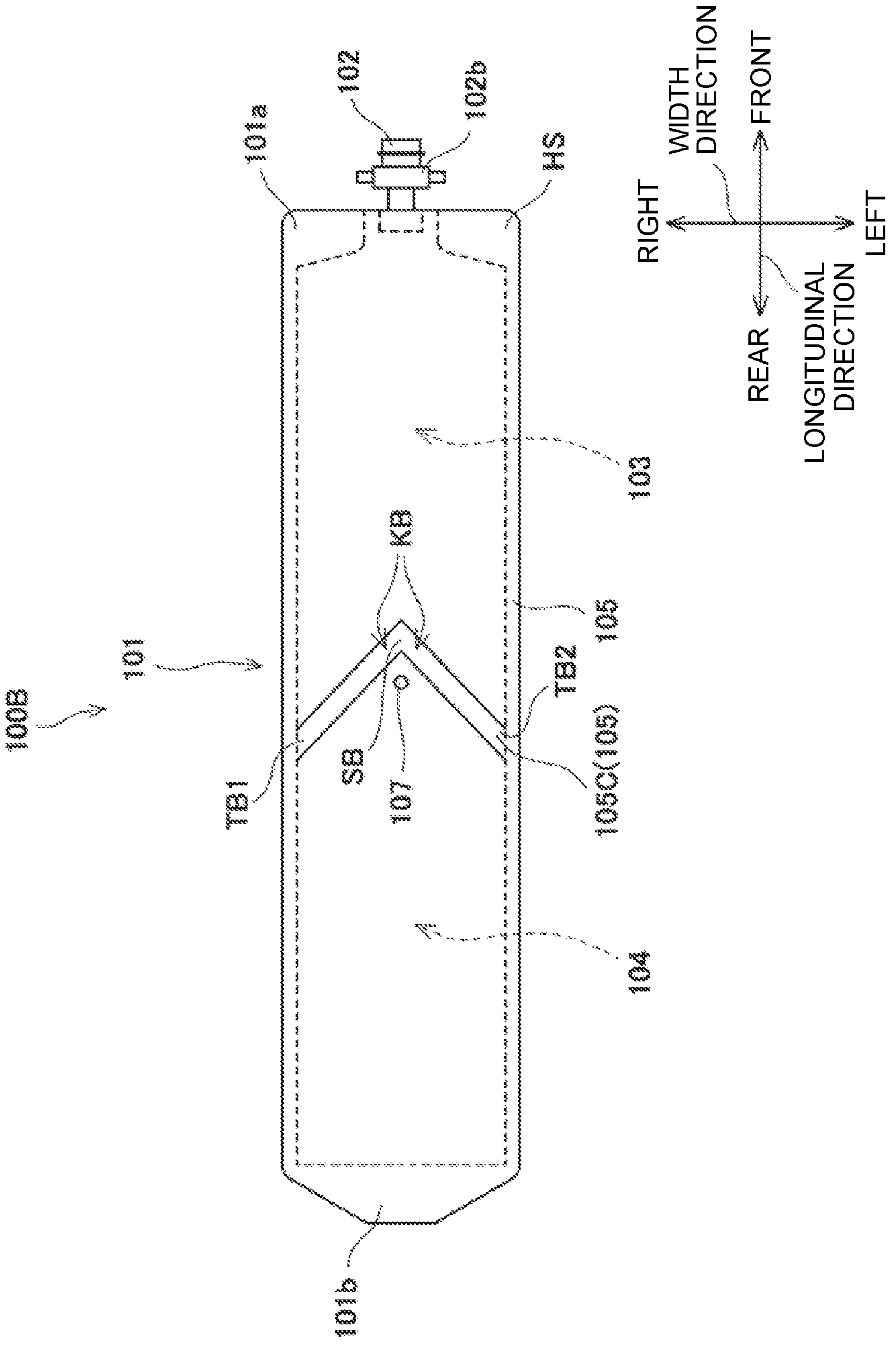
FIG. 8 is a plane view depicting an example of the liquid pack.

Next, a liquid pack 100B of a third embodiment will be explained. FIG. 8 is a plane view depicting the liquid pack 100B according to the third embodiment.

As depicted in FIG. 8, also in the third embodiment, similarly to the first embodiment, a partitioning part 105C is arranged so that a liquid storing chamber 103 is arranged on the near side of one end 101*a* of the pouch 101 and that a liquid-non-storing chamber 104 is arranged on the near side of the other end 101*b* of the pouch 101.

The pouch 101 has a plane HS which is parallel to the longitudinal direction. The partitioning part 105C is formed to have a shape of letter "V" as seen from a direction orthogonal to the plane HS. Further, the partitioning part 105C has end parts TB1, TB2 on the both sides in the width direction of the pouch 101, and a sharp end part SB (acute part SB) which is sandwiched between the end part TB1 as one of the end parts at the both sides and the end part TB2 as the other end part on the both sides in the width direction of the pouch 101. The partitioning part 105C is formed to have the shape of the letter "V" so that the sharp end part SB is located closer to the one end 101*a* of the pouch 101, in the longitudinal direction, as compared with the end parts TB1, TB2. In the third embodiment, the partitioning part 105C as a whole corresponds to the above-described part KB.

As depicted in FIG. 8, the air hole 107 is arranged in the vicinity of the sharp end part SB of the partitioning part 105C. Specifically, the air hole 107 is arranged between the end part TB1 as one of the end parts on the both sides and the end part TB2 as the other end part on the both sides, in the width direction of the pouch 101. More specifically, the air hole 107 is arranged at the center in the width direction of the pouch 101. Further, the air hole 107 is arranged, in the longitudinal direction of the pouch 101, between the end parts TB1, TB2 and the sharp end part SB of the partitioning part 105C.

Also by the liquid pack 100B of the third embodiment, it is possible to reduce the volume of the pouch 101, without changing the outer shape of the pouch 101 from that of the existing pouch, and to reduce the loss liquid (loss ink), similarly to the liquid pack 100 of the first embodiment.

Further, in the third embodiment, since the partitioning part 105C is formed to have the shape of the letter "V", it is possible to make the load on the winding roller 203 applied by the partitioning part 105C to be uniform in the width direction, thereby making the winding of the pouch 101 up by the winding roller 203 to be hardly twisted. Further, in the case of performing the winding-up by the winding roller 203, the air inside the liquid-non-storing chamber 104 easily and locally concentrates to the vicinity of the air hole 107, thereby making it possible to easily exhaust or release the air from the air hole 107 to the outside. With this, it is possible to improve the exhausting property of the air inside the liquid-non-storing chamber 104. Moreover, since the number of the air hole 107 can be made to be one, it is possible to reduce the number of the steps in a hole opening step.

Fourth Embodiment

Figure 9:
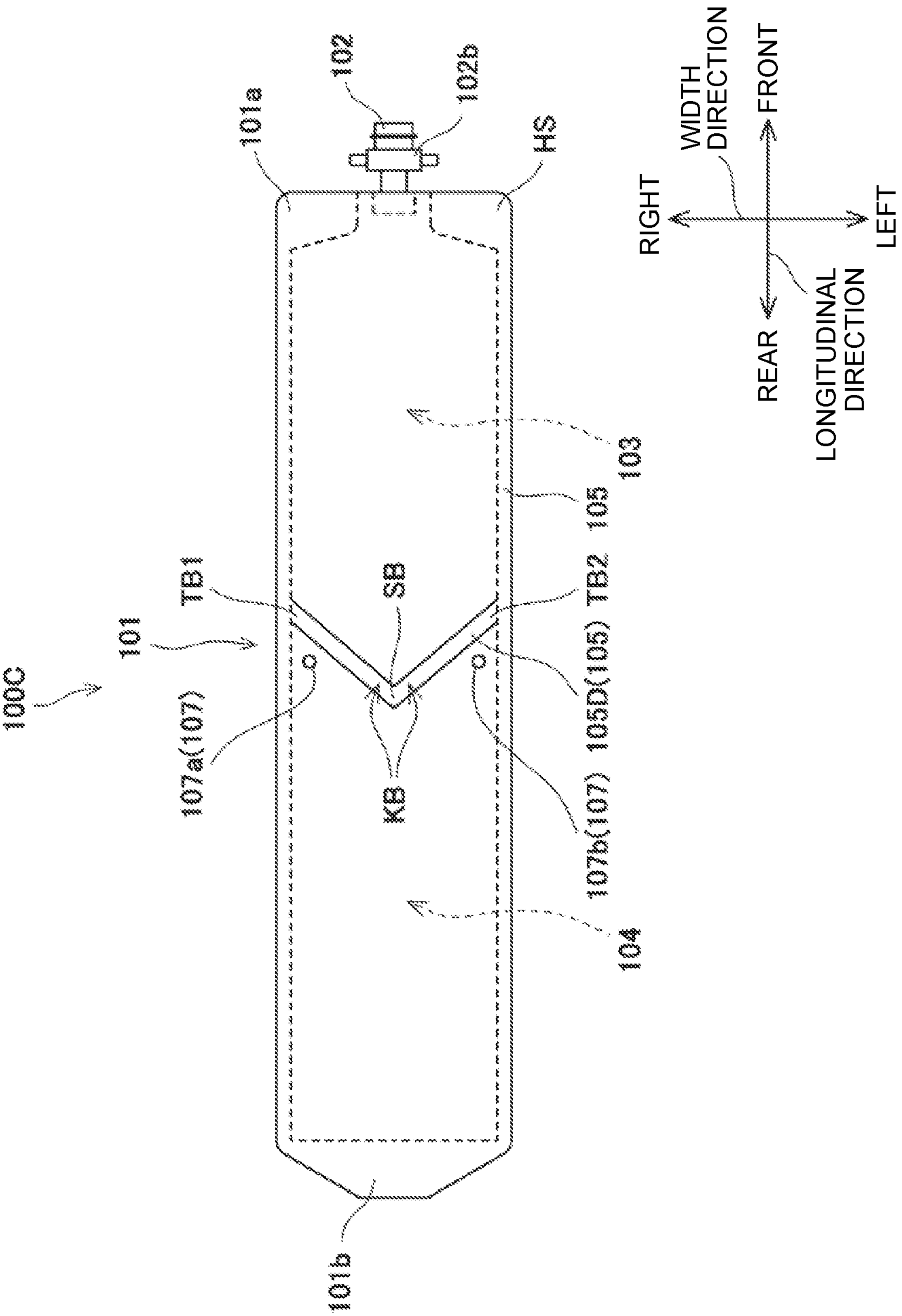
FIG. 9 is a plane view depicting an example of the liquid pack.

Next, a liquid pack 100C of a fourth embodiment will be explained. FIG. 9 is a plane view depicting the liquid pack 100C according to the fourth embodiment.

As depicted in FIG. 9, also in the fourth embodiment, similarly to the first embodiment, a partitioning part 105D is arranged so that a liquid storing chamber 103 is arranged on the near side of one end 101*a* of the pouch 101 and that a liquid-non-storing chamber 104 is arranged on the near side of the other end 101*b* of the pouch 101.

The pouch 101 has a plane HS, similarly to the partitioning part 105C of the third embodiment. The partitioning part 105D is formed to have a shape of letter "V" as seen from a direction orthogonal to the plane HS, similarly to the partitioning part HC of the third embodiment. Further, the partitioning part 105D has end parts TB1, TB2 on the both sides in the width direction of the pouch 101, and a sharp end part SB which is sandwiched between the end part TB1 as one of the end parts on the both sides and the end part TB2 as the other end part on the both sides in the width direction of the pouch 101. In the fourth embodiment, unlike in the third embodiment, the partitioning part 105D is formed to have the shape of the letter "V" so that the sharp end part SB is located closer to the other end 101*b* of the pouch 101, in the longitudinal direction, as compared with the end parts TB1, TB2. In the fourth embodiment, the partitioning part 105D as a whole corresponds to the above-described part KB.

In the fourth embodiment, the air hole 107 is provided as two air holes 107. As depicted in FIG. 9, the air hole 107 includes an air hole 107*a* (corresponding to an example of a "one side-air hole" or a "first air hole") which is arranged in the vicinity of the one end part TB1 of the partitioning part 105D, and an air hole 107*b* (corresponding to an example of a "the other side-air hole" or a "second air hole) which is arranged in the vicinity of the other end part TB2 of the partitioning part 105D. The air hole 107*a* is arranged at a location which is closer to the end part TB1 than the sharp end part SB of the partitioning part 105D in the longitudinal direction of the pouch 101. Further, the air hole 107*a* is arranged at a location which is closer to the end part TB1 than the sharp end part SB of the partitioning part 105D in the width direction of the pouch 101. Furthermore, the air hole 107*b* is arranged at a location which is closer to the end part TB2 than the sharp end part SB of the partitioning part 105D in the longitudinal direction of the pouch 101. Moreover, the air hole 107*b* is arranged at a location which is closer to the end part TB2 than the sharp end part SB of the partitioning part 105D in the width direction of the pouch 101.

Also by the liquid pack 100C of the fourth embodiment, it is possible to reduce the volume of the pouch 101, without changing the outer shape of the pouch 101 from that of the existing pouch, and to reduce the loss liquid (loss ink), similarly to the liquid pack 100 of the first embodiment.

Further, in the fourth embodiment, since the partitioning part 105D is formed to have the shape of the letter "V", it is possible to make the load on the winding roller 203 applied by the partitioning part 105C to be uniform in the width direction, thereby making the winding of the pouch 101 up by the winding roller 203 to be hardly twisted. Further, in the case of performing the winding-up by the winding roller 203, the air inside the liquid-non-storing chamber 104 easily and locally concentrates to the vicinity of each of the air holes 107*a* and 107*b*, thereby making it possible to easily exhaust or release the air from the air holes 107*a* and 107*b* to the outside. With this, it is possible to improve the exhausting property of the air inside the liquid-non-storing chamber 104. Moreover, in the fourth embodiment, at a central part, in the width direction of the pouch 101, wherein a pressure generated in such a case that the pouch 101 is dropped is likely to be high, such pressure is easily dispersed to the both sides in the width direction of the pouch 101, thereby making the pouch 101 to be unlikely to be torn or ripped.

Fifth Embodiment

Figure 10:
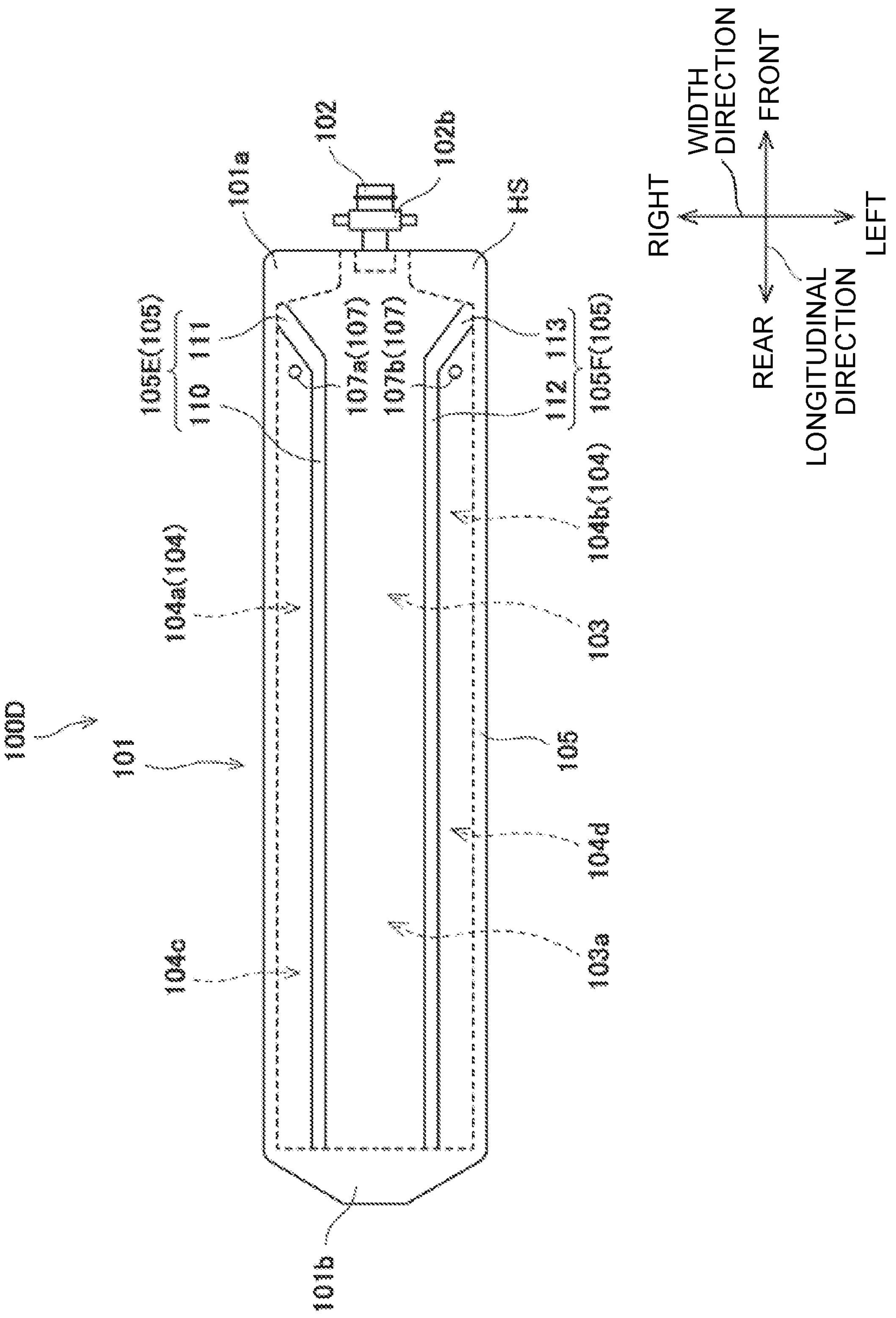
FIG. 10 is a plane view depicting an example of the liquid pack.

Next, a liquid pack 100D of a fifth embodiment will be explained. FIG. 10 is a plane view depicting the liquid pack 100D according to the fifth embodiment.

The liquid pack 100D of the fifth embodiment is provided with a liquid storing chamber 103, and a liquid-non-storing chamber 104 which includes a first liquid-non-storing chamber 104*a* and a second liquid-non-storing chamber 104*b*. In the fifth embodiment, unlike in the first embodiment, the liquid storing chamber 103 is not arranged on the near side of the one end 101*a* of the pouch 101, and the liquid-non-storing chamber 104 is not arranged on the near side of the other end 101*b* of the pouch 101. In the following, the fifth embodiment will be explained in detail.

As depicted in FIG. 10, the liquid pack 100D is provided with a partitioning part 105E and a partition part 105F. The partitioning part 105E is disposed on the right side with respect to the partitioning part 105F, and has an extending part 110 extending in the longitudinal direction of the pouch 101, and an oblique part 111. A rear end of the oblique part 111 is connected to a front end of the extending part 110, and a front end of the oblique part 111 is connected to a sealing part 105 on the right side. On the other hand, the partitioning part 105F has an extending part 112 extending in the longitudinal direction of the pouch 101, and an oblique part 113. A rear end of the oblique part 113 is connected to a front end of the extending part 112, and a front end of the oblique part 113 is connected to a sealing part 105 on the left side. In such a configuration, the extending part 110 of the partitioning part 105E is arranged at a position which is apart, by a predetermined distance, from the center in the width direction of the pouch 101, and the extending part 112 of the partitioning part 105F is also arranged at a position which is apart, by a distance which is same as the predetermined distance, from the center in the width direction of the pouch 101.

The first liquid-non-storing chamber 104*a* is formed by the sealing part 105 and the above-described partitioning part 105E. Further, the second liquid-non-storing chamber 104*b* is formed by the sealing part 105 and the above-described partitioning part 105F. Furthermore, the liquid storing chamber 103 has a part 103*a* which is sandwiched by the first liquid-non-storing part 104*a* and the second non-liquid storing part 104*b*. With this, the first liquid-non-storing chamber 104*a* has a part 104*c* which is positioned side by side, in the width direction of the pouch 101, with the above-described part 103*a* of the liquid storing chamber 103 and the second non-liquid-storing chamber 104*b*. Moreover, the second liquid-non-storing chamber 104*b* has a part 104*d* which is positioned side by side, in the width direction of the pouch 101, with the above-described part 104*c* of the first liquid storing chamber 104*a* and the above-described part 103*a* of the liquid storing chamber 103. Furthermore, the above-described part 103*a* of the liquid storing chamber 103 is arranged side by side, in the width direction of the pouch 101, with the above-described part 104*c* of the first non-liquid-storing chamber 104*a* and the above-described part 104*d* of the second liquid-non-storing chamber 104*b*.

As depicted in FIG. 10, the air hole 107 includes an air hole 107*a* arranged in the vicinity of the oblique part 111 of the partitioning part 105E, and an air hole 107*b* arranged in the vicinity of the oblique part 113 of the partitioning part 105F. The air hole 107*a* is arranged, for example, at a position which is same, in the longitudinal direction of the pouch 101, with an intersection point of the extending part 110 with the oblique part 111 of the partitioning part 105E. The air hole 107*a* is arranged, for example, at a position which is between, in the width direction of the pouch 101, the extending part 110 and the front end of the oblique part 111 of the partitioning part 105E. Further, the air hole 107*b* is arranged, for example, at a position which is same, in the longitudinal direction of the pouch 101, with an intersection point of the extending part 112 with the oblique part 113 of the partitioning part 105F. The air hole 107*b* is arranged, for example, at a position which is between, in the width direction of the pouch 101, the extending part 112 and the front end of the oblique part 113 of the partitioning part 105F.

Also by the liquid pack 100D of the fifth embodiment, it is possible to reduce the volume of the pouch 101, without changing the outer shape of the pouch 101 from that of the existing pouch, and to reduce the loss liquid (loss ink), similarly to the liquid pack 100 of the first embodiment.

Further, in the fifth embodiment, it is possible to make the load on the winding roller 203 applied by the partitioning parts 105E and 105F to be uniform in the width direction, thereby making the winding-up of the pouch 101 by the winding roller 203 to be hardly twisted. Further, in the case of performing the winding-up by the winding roller 203, the air inside the first liquid-non-storing chamber 104*a* easily and locally concentrates to the vicinity of the air hole 107*a* and the air inside the first liquid-non-storing chamber 104*b* easily and locally concentrates to the vicinity of the air hole 107*b*, thereby making it possible to easily exhaust or release the air from the air holes 107*a* and 107*b* to the outside. With this, it is possible to improve the exhausting property of the air inside the first liquid-non-storing chamber 104*a* and the exhausting property of the air inside the second liquid-non-storing chamber 104*b*.

Sixth Embodiment

Figure 11:
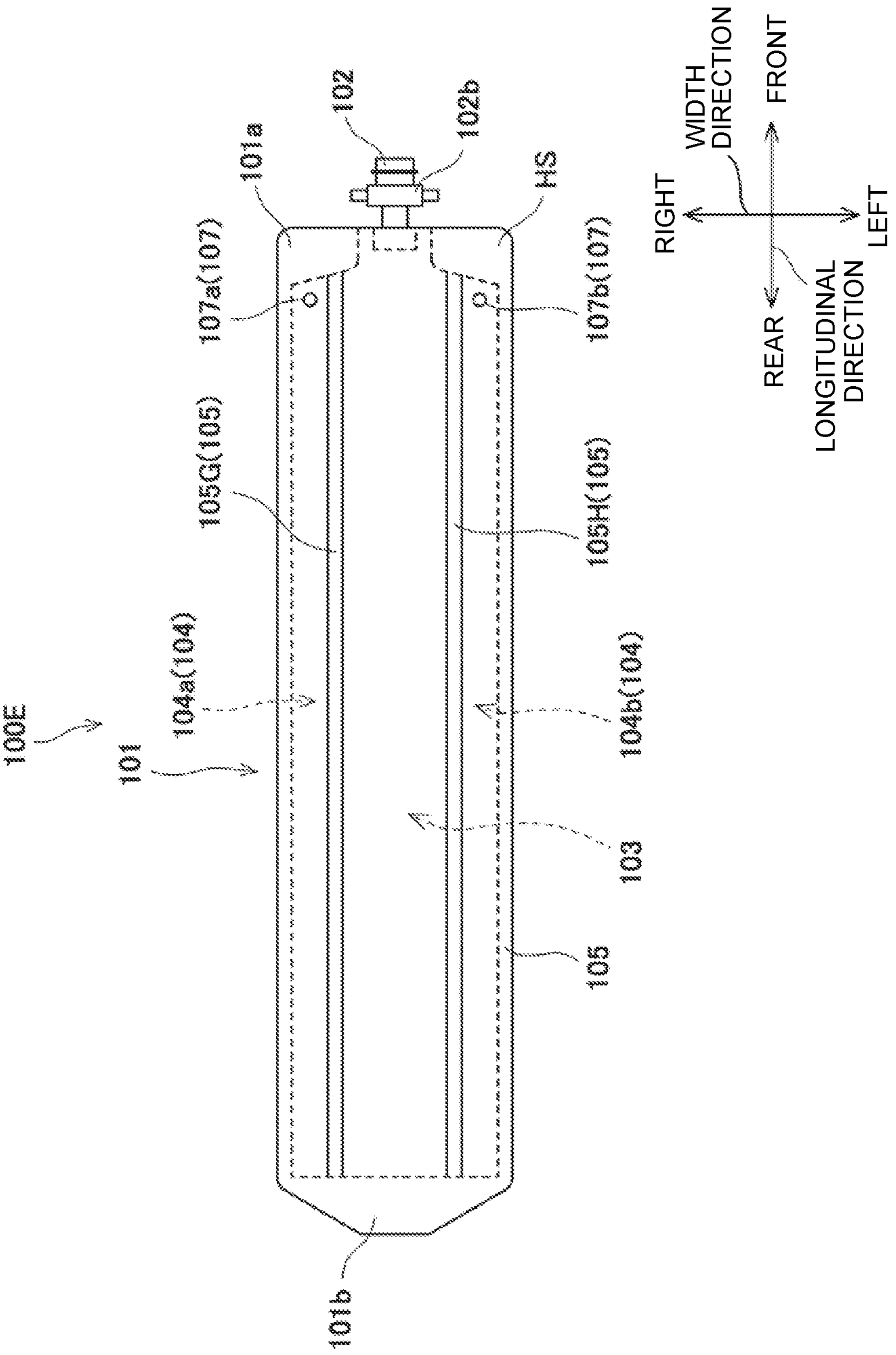
FIG. 11 is a plane view depicting an example of the liquid pack.

Next, a liquid pack 100E of a sixth embodiment will be explained. FIG. 11 is a plane view depicting the liquid pack 100E according to the sixth embodiment.

The liquid pack 100E of the sixth embodiment is provided with a liquid storing chamber 103, and a liquid non-storing chamber 104 including a first liquid-non-storing chamber 104*a* and a second liquid-non-storing chamber 104*b* which are arranged to be apart from each other in the width direction of the pouch 101. Also in the sixth embodiment, unlike in the first embodiment, the liquid storing chamber 103 is not arranged on the near side of the one end 101*a* of the pouch 102, and the liquid-non-storing chamber 104 is not arranged on the near side of the other end 101*b* of the pouch 101. In the following, the sixth embodiment will be explained in detail.

As depicted in FIG. 11, the liquid pack 100E is provided with a partitioning part 105G and a partition part 105H. The partitioning part 105G is disposed on the right side with respect to the partitioning part 105H, and extends in the longitudinal direction of the pouch 101. Further, the partitioning part 105H extends in the longitudinal direction of the pouch 101, parallel to the partitioning part 105G. The partitioning part 105G is arranged at a position which is apart, by a predetermined distance, from the center in the width direction of the pouch 101, and the partitioning part 105H is also arranged at a position which is apart, by a distance which is same as the predetermined distance, from the center in the width direction of the pouch 101. Owing to such a configuration, the liquid storing chamber 103 is positioned, in the width direction of the pouch 101, between the first liquid non-storing chamber 104*a* and the second liquid-non-storing chamber 104*b*.

The first liquid-non-storing chamber 104*a* is formed by the sealing part 105 and the above-described partitioning part 105G. Further, the second liquid-non-storing chamber 104*b* is formed by the sealing part 105 and the above-described partitioning part 105H. Furthermore, the liquid storing chamber 103 is formed by the partitioning part 105G, the partitioning part 105H and the sealing part 105.

As depicted in FIG. 11, the air hole 107 includes an air hole 107*a* arranged at a front part of the first liquid-non-storing chamber 104*a*, and an air hole 107*b* arranged at a front part of the second liquid-non-storing chamber 104*b*.

Also by the liquid pack 100E of the sixth embodiment, it is possible to reduce the volume of the pouch 101, without changing the outer shape of the pouch 101 from that of the existing pouch, and to reduce the loss liquid (loss ink), similarly to the liquid pack 100 of the first embodiment.

Further, in the sixth embodiment, it is possible to make the load on the winding roller 203 applied by the partitioning parts 105G and 105H to be uniform in the width direction, thereby making the winding-up of the pouch 101 by the winding roller 203 to be hardly twisted. Further, in the case of performing the winding-up by the winding roller 203, the air inside the first liquid-non-storing chamber 104*a* easily and locally concentrates to the vicinity of the air hole 107*a* and the air inside the second liquid-non-storing chamber 104*b* easily and locally concentrates to the vicinity of the air hole 107*b*, thereby making it possible to easily exhaust or release the air from the air holes 107*a* and 107*b* to the outside. With this, it is possible to improve the exhausting property of the air inside the first liquid-non-storing chamber 104*a* and the exhausting property of the air inside the second liquid-non-storing chamber 104*b*.

Seventh Embodiment

Figure 12:
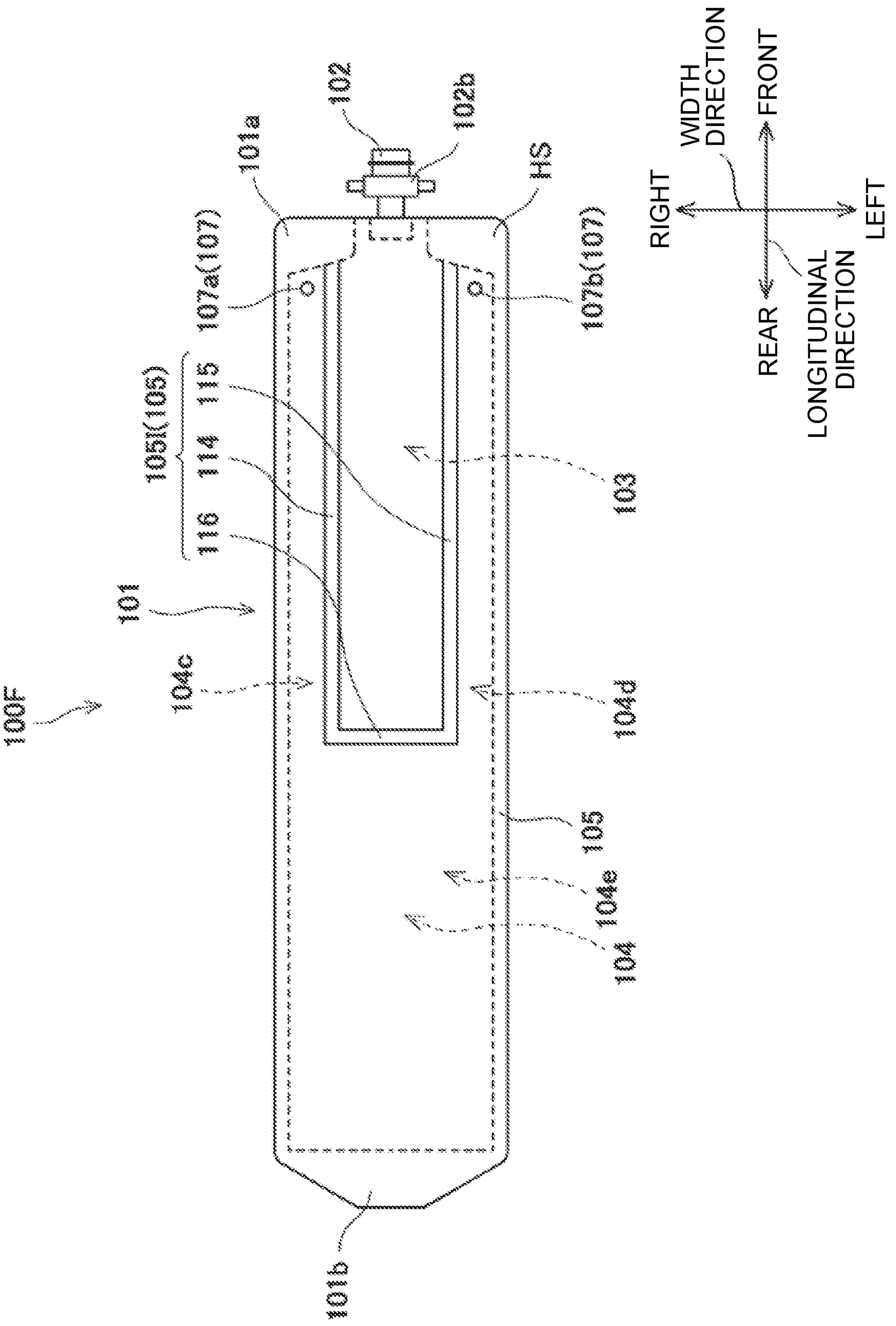
FIG. 12 is a plane view depicting an example of the liquid pack.

Next, a liquid pack 100F of a seventh embodiment will be explained. FIG. 12 is a plane view depicting the liquid pack 100F according to the seventh embodiment.

The liquid pack 100F of the seventh embodiment is provided with a liquid storing chamber 103, and a liquid non-storing chamber 104. In the seventh embodiment, unlike in the first embodiment, the liquid storing chamber 103 is arranged on the near side of the one end 101*a* of the pouch 101, whereas the entirety of the liquid-non-storing chamber 104 is not arranged on the near side of the other end 101*b* of the pouch 101. In the following, the seventh embodiment will be explained in detail.

As depicted in FIG. 12, the liquid pack 100F is provided with a partitioning part 105I having a first extending part 114 and a second extending part 115 which extend in the longitudinal direction of the pouch 101, and a linking part 116 which links or connects the first extending part 114 and the second extending part 115. The first extending part 114 of the partitioning part 105I is disposed on the right side with respect to the second extending part 115, and is arranged to be parallel to the second extending part 115. The first extending part 114 is arranged at a position which is apart, by a predetermined distance, from the center in the width direction of the pouch 101, and the second extending part 115 is also arranged at a position which is apart, by a distance which is same as the predetermined distance, from the center in the width direction of the pouch 101.

A front end of the first extending part 114 of the partitioning part 105I is connected to a front part of the sealing part 105, and a rear end of the first extending part 114 is connected to a right end of the linking part 116. The first extending part 114 of the partitioning part 105I extends from the front part of the sealing part 105 up to a substantially center in the longitudinal direction of the pouch 101. Similarly, a front end of the second extending part 115 of the partitioning part 105I is connected to the front part of the sealing part 105, and a rear end of the second extending part 115 is connected to a left end of the linking part 116. The second extending part 115 of the partitioning part 105I extends from the front part of the sealing part 105 up to the substantially center in the longitudinal direction of the pouch 101.

Owing to the above-described configuration, the liquid non-storing chamber 104 has a part 104*c* which is on the right side in the width direction of the pouch 101 and which is positioned in a front region in the longitudinal direction of the pouch 101, a part 104*d* which is on the left side in the width direction of the pouch 101 and which is positioned in the front region in the longitudinal direction of the pouch 101, and a part 104*e* which is positioned in a rear region in the longitudinal direction of the pouch 101. The liquid storing chamber 103 is formed by the first extending part 114, the second extending part 115 and the linking part 116 of the partitioning part 105I, and is positioned between the part 104*c* and the part 104*d* of the liquid-non-storing chamber 104. Owing to such a configuration, the pars 104*c* and 104*d* of the liquid-non-storing chamber 104 is positioned as being side by side to the liquid storing chamber 103, in the width direction of the pouch 101.

As depicted in FIG. 12, the air hole 107 includes an air hole 107*a* arranged at a front part of the part 104*c* of the liquid-non-storing chamber 104, and an air hole 107*b* arranged at a front part of the part 104*d* of the liquid-non-storing chamber 104.

Also by the liquid pack 100F of the seventh embodiment, it is possible to reduce the volume of the pouch 101, without changing the outer shape of the pouch 101 from that of the existing pouch, and to reduce the loss liquid (loss ink), similarly to the liquid pack 100 of the first embodiment.

Further, in the seventh embodiment, it is possible to make the load on the winding roller 203 applied by the partitioning part 105I to be uniform in the width direction, thereby making the winding-up of the pouch 101 by the winding roller 203 to be hardly twisted. Further, in the case of performing the winding-up by the winding roller 203, the air inside the part 104*c* of the liquid-non-storing chamber 104 easily and locally concentrates to the vicinity of the air hole 107*a* and the air inside the part 104*d* of the liquid-non-storing chamber 104 easily and locally concentrates to the vicinity of the air hole 107*b*, thereby making it possible to easily exhaust or release the air from the air holes 107*a* and 107*b* to the outside. With this, it is possible to improve each of the exhausting property of the air inside the parts 104*c* and the exhausting property of the air inside 104*d* of the liquid-non-storing chamber 104.

<Method of Producing Liquid Pack>

Figure 13:
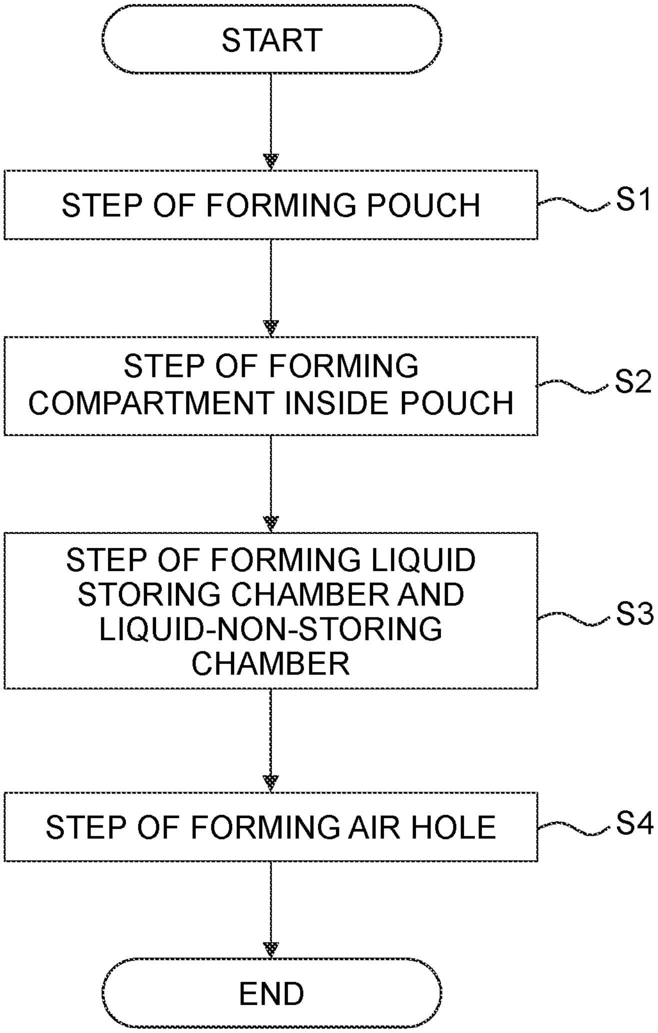
FIG. 13 is a flow chart indicating a method of producing a liquid pack.

Next, a method of producing the liquid pack 100 will be explained, with reference to a flow chart. FIG. 13 is a flow chart indicating the method of producing the liquid pack 101.

As depicted in FIG. 13, first, periphery parts SP, respectively, of two films F1 and F2 are welded so as to form a pouch 101 having a bag shape including an opening H1 which communicates with the outside and which is provided on one end 101*a* in the longitudinal direction of the pouch 101 (step S1).

Next, a spout 102 is attached to the opening H1 of the pouch 101 by the welding so as to form, inside the pouch 101, a compartment 106 by a sealing part 105 which is a welded part of the two films F1 and F2, and the spout 102 (step S2).

Subsequently, the two films F1 and F2 are welded partially so as to partition the compartment 106 into a liquid storing chamber 103 on a side of one end 101*a* in the longitudinal direction of the pouch 101 and a liquid-non-storing chamber 104 on a side of the other end 101*b* in the longitudinal direction of the pouch 101 (step S3). Next, an air hole 107, penetrating through the two films F1 and F2 is provided on each of the parts of the two films F1 and F2, respectively, the parts corresponding to the liquid-non-storing chamber 104 (step S4). With these as described above, the liquid pack 100 is produced. In such a manner, it is possible to form the compartment 106 before being partitioned by the partitioning part 105A to be a pouch 101 having a normal volume (ordinary volume), and to form the compartment 106 after having been partitioned by the partitioning part 105A to be a pouch 101 having a small volume. Accordingly, it is possible to easily produce the pouches 101 having the two kinds of volumes whether or not being partitioned by the partitioning part 105A.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The present disclosure is not limited to or restricted by the above-described embodiments. Various changes or modifications may be made without departing from the gist or spirit of the present disclosure. For example, it is allowable to adopt the following configuration.

In the above-described embodiments, although the number of the air hole 107 is made to be 1 or 2, the present disclosure is not limited to this. It is allowable to provide three or more air holes 107 as appropriately. In such a case, the number of the air hole may be set while considering the exhausting property of the air to the outside.

In the second to sixth embodiments, the air hole 107 can be arranged at the area extending from the position, of the partitioning part 105A, closest to one end (spout side) of pouch 101 toward the other end 101*b* of the pouch 101, the length in the longitudinal direction of the pouch 101 of the area corresponding to the diameter of the winding roller 203. In such a manner, by arranging the air hole 107 as close as possible to the vicinity of the partitioning part 105A, it is possible to prevent the air hole 107 being closed or blocked by a part, of the pouch 101, which has been already wound up in the case of winding the pouch 101 up by the winding roller 203. With this, it is possible to satisfactorily release the air inside the liquid-non-storing chamber 104 from the air hole 107 in the case of performing the winding-up with the winding roller 203.

Further, in the above-described embodiments, although the pouch 101 is constructed of the two films F1 and F2, the present disclosure is not limited to this. It is allowable, for example, to constructed the pouch 101 with one film.

Furthermore, in the above-described embodiments, although the explanation has been given regarding the case in which the ink is used as the liquid, the present disclosure is not limited to this. It is allowable, for example, to use oil, fuel, a liquid which is usable in the industrial field such as, for example, a liquid in which metallic particles for printing a wiring pattern are dispersed, etc., detergent and soft drink.

What is claimed is:

1. A liquid pack comprising:
a pouch configured to store a liquid therein; and
a spout configured to be connectable to a part at one end in a first direction of the pouch, and including a channel in which the liquid passes,
wherein the pouch includes:
- a liquid storing chamber configured to store the liquid therein and communicating with the channel of the spout,
- a sealing part configured to seal surrounding of the liquid storing chamber, and
- a liquid-non-storing chamber which is positioned to be isolated with respect to the spout by the liquid storing chamber and the sealing part, and in which the liquid is not stored,
- the sealing part includes a partitioning part located between the one end and the other end of the pouch in the first direction,
- the liquid storing chamber is arranged between the one end of the pouch and the partition part, and
- the liquid-non-storing part is arranged between the other end of the pouch and the partition part.

2. The liquid pack according to claim 1, wherein
the pouch is elongated in a longitudinal direction,
the first direction is the longitudinal direction of the pouch.

3. The liquid pack according to claim 2, wherein
the partitioning part is formed by heat welding, and
the pouch includes an air hole connecting the liquid-non-storing chamber and outside of the pouch.

4. The liquid pack according to claim 3, wherein
the liquid pack is configured to be attachable and detachable with respect to a cartridge case, the case including a pushing out mechanism configured to apply a force to the liquid storing chamber so as to push the liquid out, and
in a case that the liquid pack is installed in the cartridge case, the pouch makes contact with the pushing out mechanism.

5. The liquid pack according to claim 4, wherein
the pushing out mechanism is a winding mechanism configured to wind the pouch.

6. The liquid pack according to claim 5, wherein
the winding mechanism includes a winding roller including a roller shaft, the roller shaft extending in a width direction which crosses the longitudinal direction of the pouch, and
in the case that the liquid pack is installed in the cartridge case, the partitioning part includes a part which crosses the roller shaft in an extending direction of the partitioning part.

7. The liquid pack according to claim 6, wherein the pouch has a plane parallel to the longitudinal direction, the partitioning part has a shape of a letter V as seen from a direction orthogonal to the plane, and has end parts on both sides in the width direction, of the pouch, orthogonal to the longitudinal direction, the partitioning part including a sharp end part which is sandwiched between the end parts on the both sides, and the sharp end part is located closer to the other end part of the pouch, in the longitudinal direction, as compared with the end parts on the both sides.

8. The liquid pack according to claim 7, wherein the end parts on the both sides include an end part on one side arranged on one side in the width direction, and an end part on the other end arranged on the other side in the width direction, and the air hole includes at least one of a first air hole which is arranged, in the longitudinal direction, between the sharp end part and the end part on the one side in the width direction, or a second air hole arranged, in the longitudinal direction, between the sharp end part and the end part on the other side in the width direction.

9. The liquid pack according to claim 6, wherein an opening of the air hole is arranged at an area extending from the partitioning part toward the other end, a length in the longitudinal direction of the pouch of the area corresponding to a diameter of the winding roller.

10. The liquid pack according to claim 5, wherein the winding mechanism includes a winding roller including a roller shaft, the roller shaft extending in a width direction which crosses the longitudinal direction of the pouch, and the partitioning part extends parallel to the width direction.

11. The liquid pack according to claim 10, wherein an opening of the air hole is arranged at an area extending from the partitioning part toward the other end, a length in the longitudinal direction of the pouch of the area corresponding to a diameter of the winding roller.

12. The liquid pack according to claim 1, wherein the liquid pack is configured to be attachable and detachable with respect to a cartridge case, and the spout includes a positioning part with respect to the cartridge case, the positioning part protruding from the pouch.

13. The liquid pack according to claim 12, wherein the liquid is an ink for a printer, and the cartridge case is configured to be attachable and detachable with respect to the printer.

14. The liquid pack according to claim 1, wherein the pouch is elongated in a longitudinal direction, and a part of the liquid storing chamber and a part of the liquid-non-storing chamber are arranged side by side in a width direction crossing the longitudinal direction of the pouch.

15. The liquid pack according to claim 14, wherein the liquid-non-storing chamber includes a first liquid-non-storing chamber and a second liquid-non-storing chamber arranged to be separated from the first liquid-non-storing chamber in the width direction, and the liquid storing chamber is arranged between the first liquid-non-storing chamber and the second liquid-non-storing chamber in the width direction.

16. A method of producing a liquid pack comprising:

welding periphery parts, respectively, of two films to thereby form a pouch having a bag shape including an opening which is provided on one end, in a first direction, of the pouch and which communicates with outside of the pouch;

attaching a spout to the opening of the pouch to thereby form, inside the pouch, a compartment by a welded part of the two films and the spout;

welding the two films partially so as to partition the compartment into a liquid storing chamber on a side of the one end in the first direction of the pouch and a liquid-non-storing chamber on a side of the other end in the first direction of the pouch; and forming an air hole penetrating through the two films in each of parts of the two films, respectively, the parts corresponding to the liquid-non-storing chamber.

* * * * *